Jan. 18, 1944. C. H. TURNER 2,339,441
VEHICLE VENTILATOR
Filed March 27, 1940 5 Sheets-Sheet 1
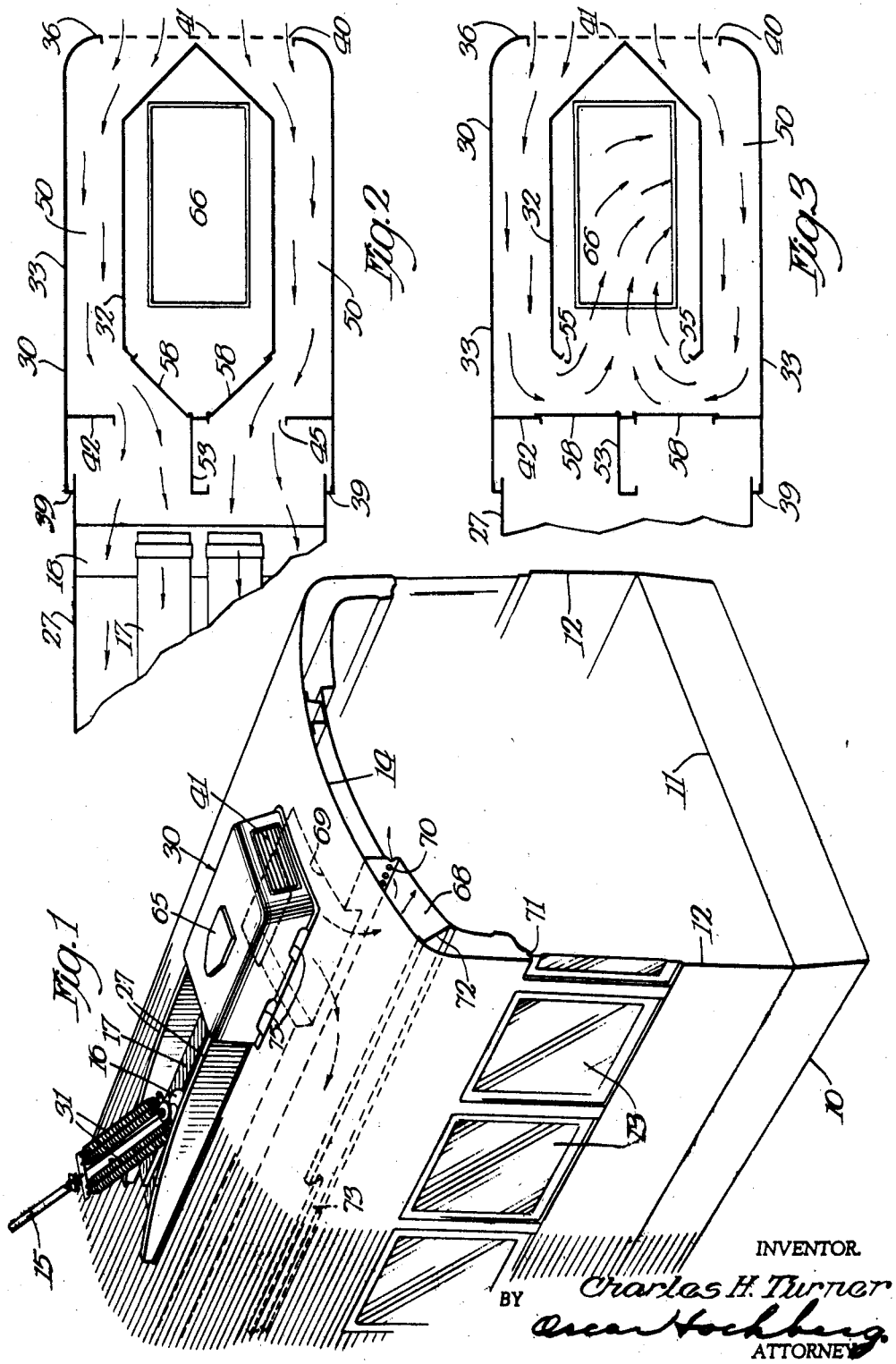
INVENTOR.
Charles H. Turner
BY Oscar Hochberg
ATTORNEY

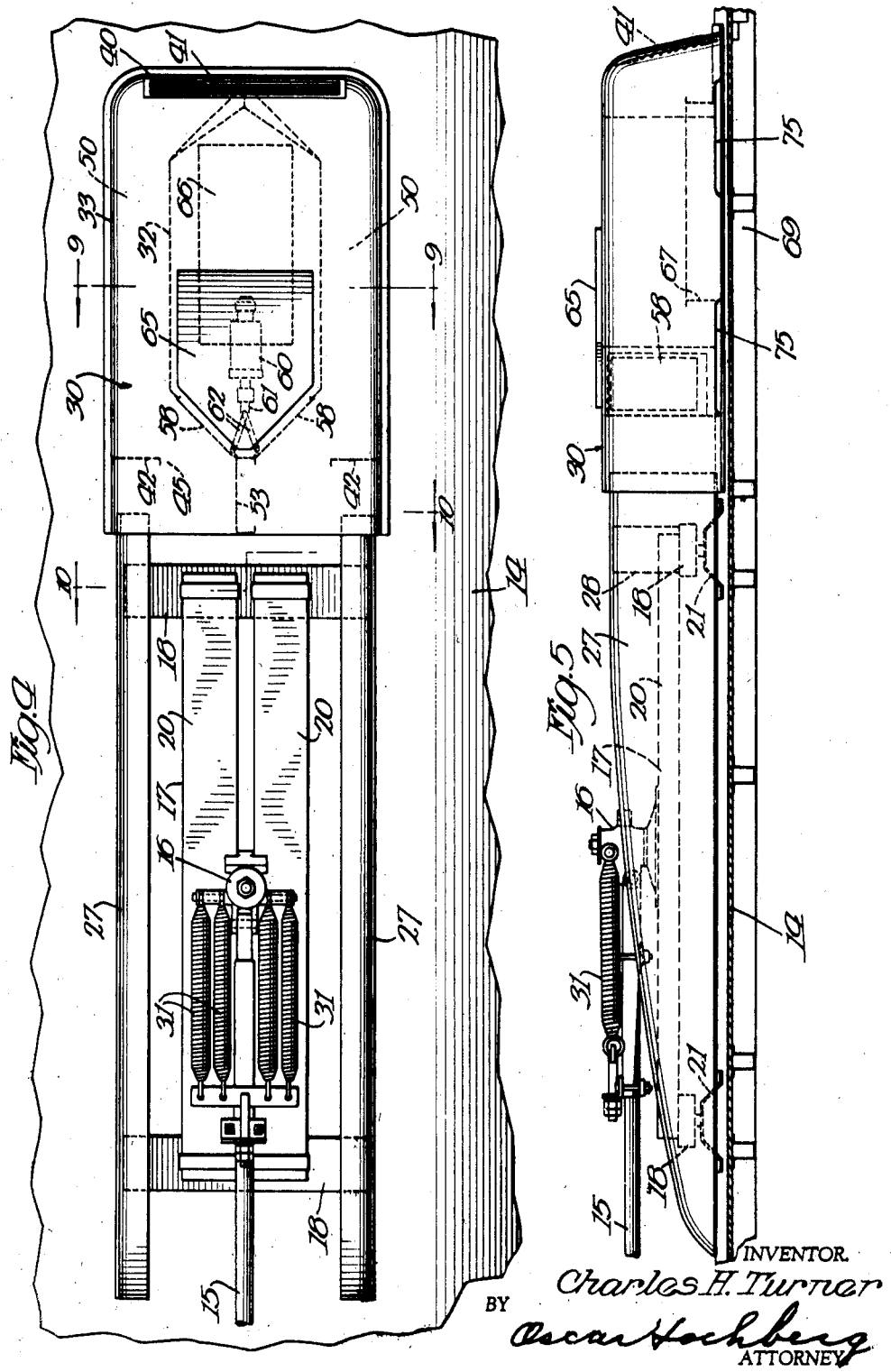

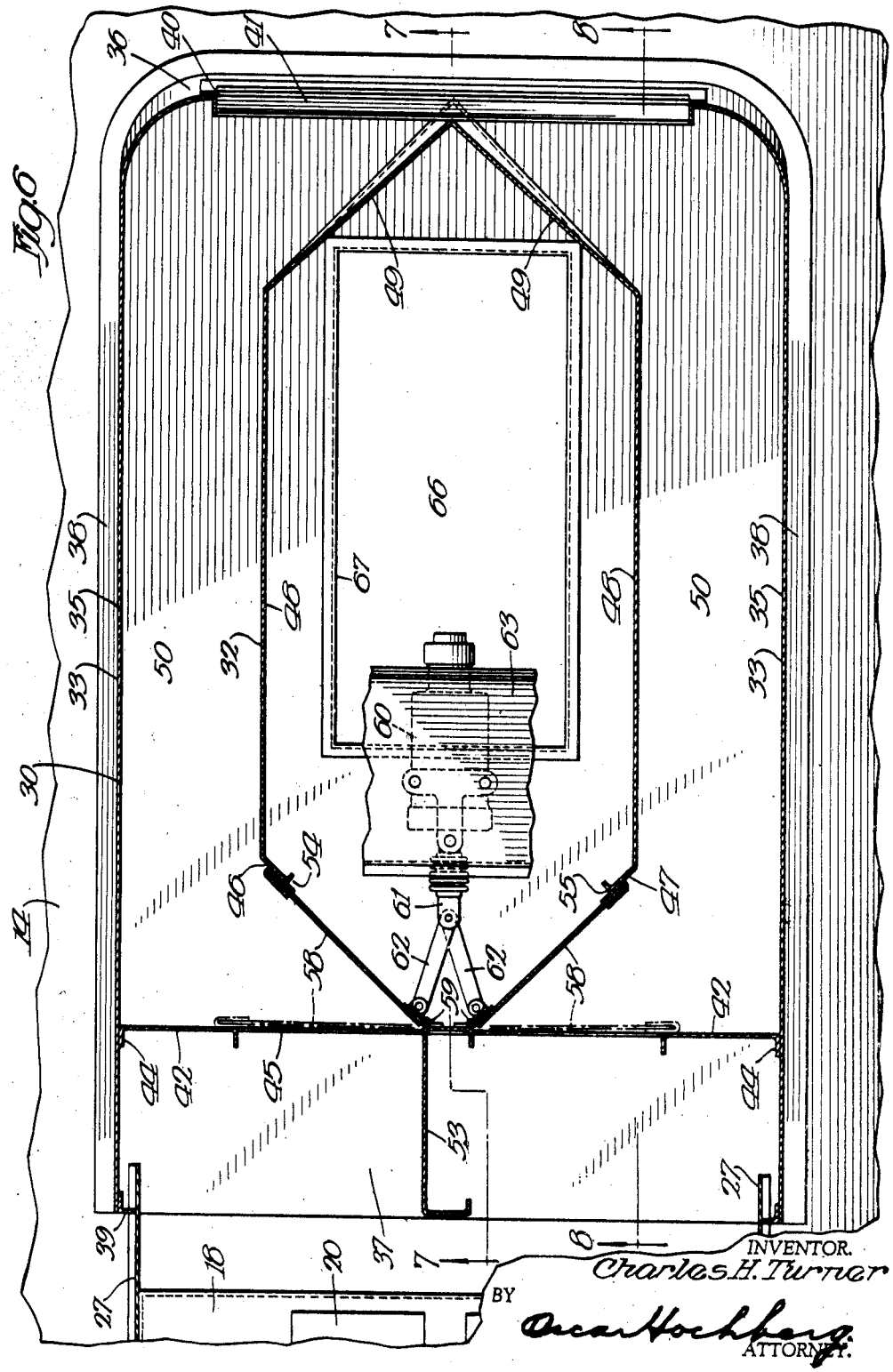

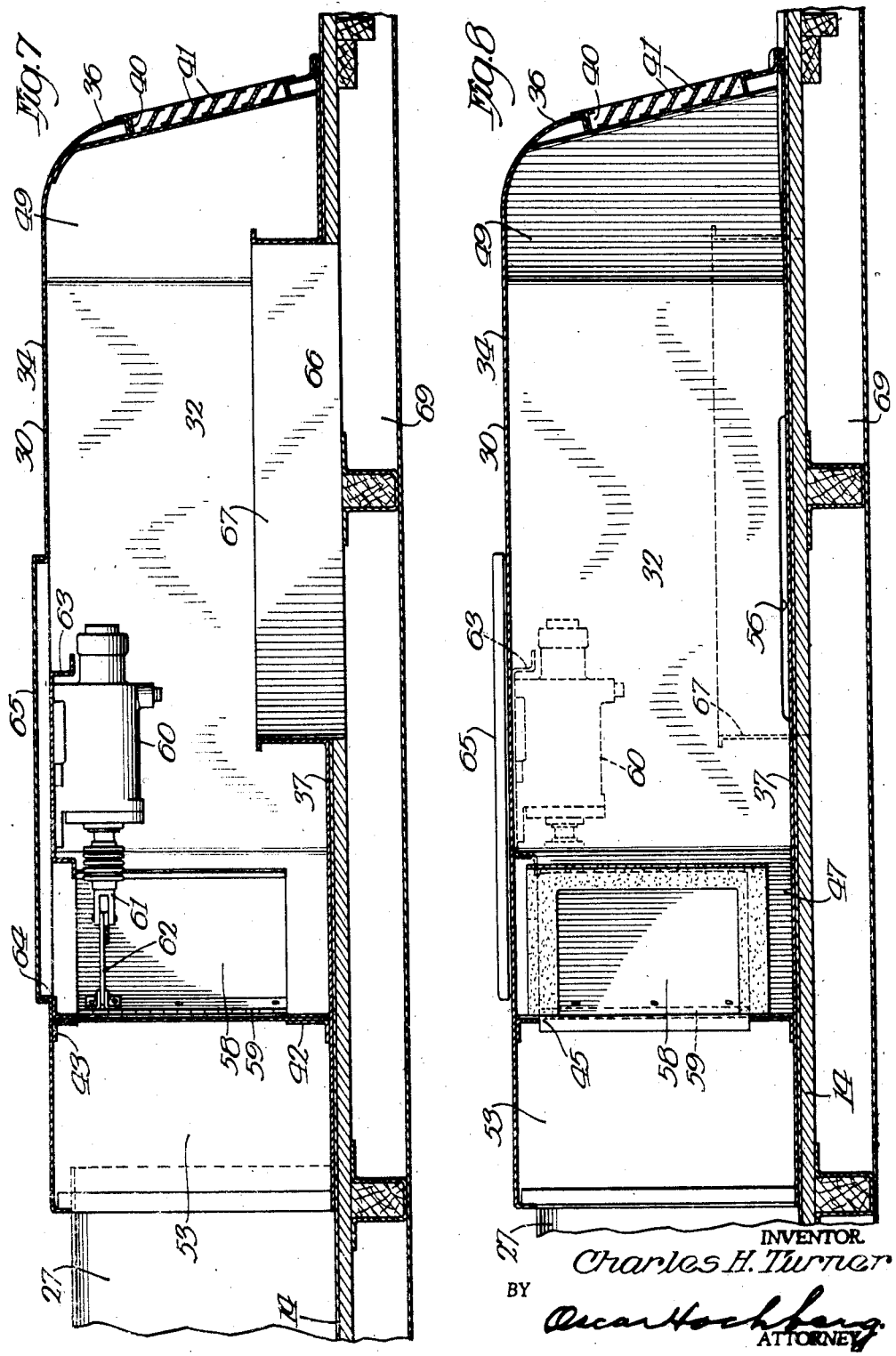

Jan. 18, 1944. C. H. TURNER 2,339,441
VEHICLE VENTILATOR
Filed March 27, 1940 5 Sheets-Sheet 5
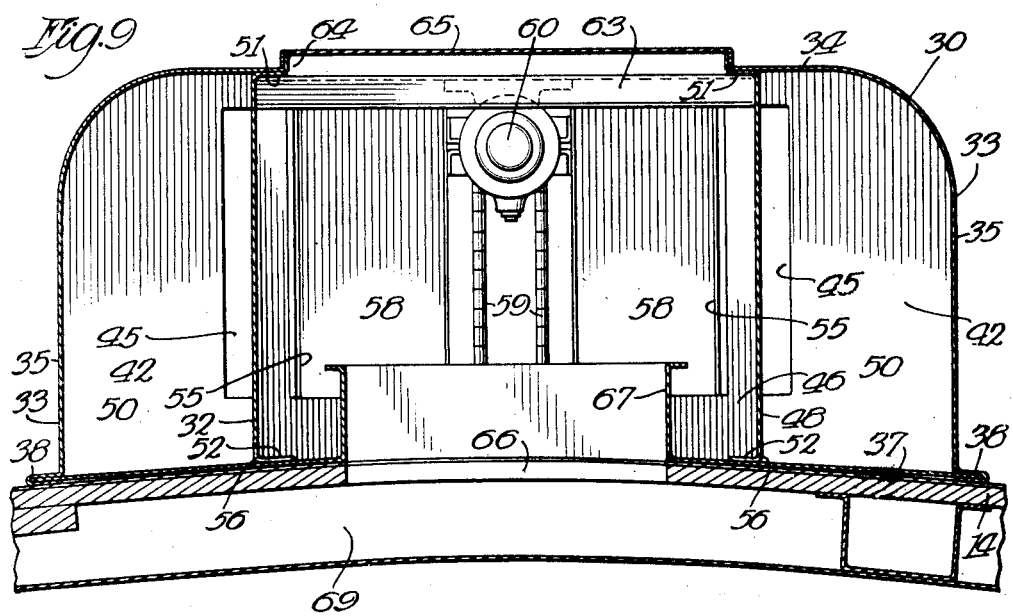
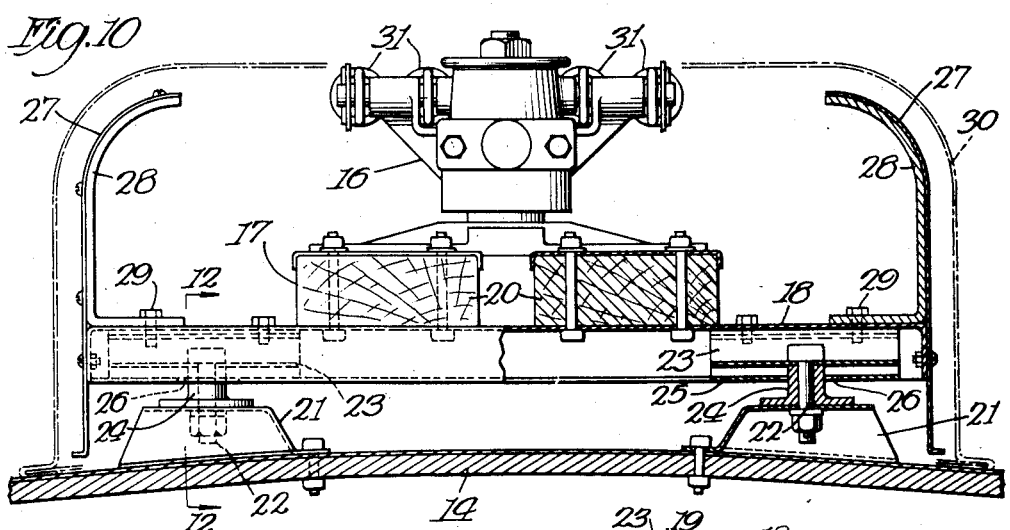
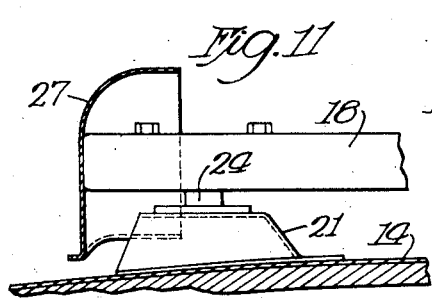
INVENTOR.
Charles H. Turner
BY
Oscar Hochberg
ATTORNEY.

Patented Jan. 18, 1944

2,339,441

UNITED STATES PATENT OFFICE 2,339,441

VEHICLE VENTILATOR

Charles H. Turner, Worcester, Mass., assignor to Pullman-Standard Car Manufacturing Company, Chicago, Ill., a corporation of Delaware Application March 27, 1940, Serial No. 326,127

8 Claims. (Cl. 98—13)

This invention relates to a ventilator especially adapted to use in connection with trolley vehicles and has for its particular object the provision of a ventilator communicating with the vehicle interior and associated with the trolley mounting.

The invention contemplates a vehicle ventilator mounted at the trolley base and open at the forward end to induce a flow of air therethrough and capable of directing such flow of air either to the vehicle interior or over the trolley base.

The principal object of the invention is the provision of an intake ventilator having an outer shell open at front and rear and an inner shell open only at the rear with damper means for closing the opening in either the inner shell or that at the rear of the outer shell, whereby air entering the front opening may be directed through the outer shell or into the inner shell.

The foregoing and other and more specific objects and advantages of the invention will become apparent as the following description is read in conjunction with the accompanying drawings, in which—

Fig. 1 is a general perspective view of a portion of a trolley vehicle equipped with the ventilator of the invention;

Figs. 2 and 3 are diagrammatic plan views of the ventilator depicting the path of the air currents in the respective positions of the control dampers with the air passing through the outer shell in the one position and into the inner shell for distribution in the other position;

Fig. 4 is a top plan view of the ventilator showing its relation to the trolley base and shroud;

Fig. 5 is a side elevational view of the ventilator and trolley-base shroud;

Fig. 6 is an enlarged, sectional plan view of the ventilator showing the inner and outer shells with the control dampers in position to direct the air through the outer shell to sweep the trolley-base shroud;

Fig. 7 is a longitudinal, sectional view through the ventilator taken on the line 7—7 of Fig. 6 through the inner shell, with the dampers closed, and showing the opening to the distribution duct;

Fig. 8 is a longitudinal, sectional view through the outer shell of the ventilator, also with the dampers closed, taken on the line 8—8 of Fig. 6;

Fig. 9 is a transverse, sectional view through the ventilator at the position of the opening to the distribution duct and taken on the line 9—9 of Fig. 4;

Fig. 10 is a transverse, sectional view taken on the line 10—10 of Fig. 4 through the trolley base shroud and mounting;

Fig. 11 is a fragmentary, sectional view through the trolley base shroud and showing one of the trolley base mountings; and Fig. 12 is a sectional view through the trolley base mounting taken on line 12—12 of Fig. 10.

In the drawings, 10 represents a trolley vehicle having a floor construction 11, side walls 12 containing windows 13 and a roof construction 14 upon which is mounted a trolley 15. The trolley 15 is carried by a swivel mounting 16 about which it has universal pivotal movement and which, in turn, is rigidly fixed to a platform 17 carried on cross members 18 flexibly supported from the roof 14 by means of resilient bushings 19. Springs 31, extending between the swivel mounting 16 and a bracket on the trolley pole, are adapted to maintain the trolley in raised position.

The platform 17 consists of parallel, wooden boards 20 fixedly secured to the metal cross members 18, and the members 18 are supported from the car roof through the medium of pressed pan brackets 21 to which the cross members are secured by means of bolts 22. The bolts 22 engage the inner, metallic portions 23 of the resilient bushings 19 and hold those members in engagement with supporting collars 29 resting upon the pans 21. The resilient bushings 19 are vulcanized to the members 23 and to flanged channel members 25 comprising the attachment to the cross members 18 and through the bottom web of which the bolt 22 and collar 24 penetrate with ample clearance 26 for free vibratory movement. It will thus be seen that the rubber bushings 19 fully insulate the trolley and its base mounting from the roof 14 and prevent transmission of vibration and sound created by the trolley pole 15 during the operation of the vehicle.

The entire trolley base mounting is concealed from view by shroud members 27 conforming to the streamlined contours of the vehicle and enclosing the trolley base fixtures. The shrouds 27 are carried by the trolley base and are secured to the cross members 18 by means of attaching brackets 28 and bolts 29, and the bottom edges thereof are spaced from the roof sufficiently to permit flexing of the complete assembly without contact with the roof. The shrouds, in addition to their streamlining qualities, function to provide an air chute from a ventilator 30 to direct air, exhausted therefrom, over the trolley base mounting to free that assembly from any accumulation of dirt or snow, and the like.

The ventilator 30 is comprised of sheet metal and consists of an outer shell 33 and an inner shell 32. The outer shell has a top portion 34, side walls 35 and a front wall 36. A separate bottom member 37 is secured to the front wall and spaced side walls, as at 38. The front wall 36 is provided with an opening 40 containing louvers 41 through which a flow of air is induced, at all times, by the motion of the car. A rear wall is formed in the outer shell by means of flanged members 42 secured to the top and bottom portions 34 and 37 and to the side walls 35 by means of flanges 43 and 44. The flanged members 42 are disposed in spaced relation to provide an opening 45 at the rear of the outer shell to permit exhaust of the air entering through the front opening 40.

The outer shell extends beyond the rear wall 42 and is adapted to enclose the forward ends of the shrouds 27; and, where these members enter the ventilator, angle members 39 close the space existing therebetween. The inner shell 32 is disposed within the outer shell in a manner to divide the openings 40 and 45 and provide separate air passages between the inner and outer shells upon opposite sides of the inner shell and extending from the opening 40 to the opening 45. The inner shell consists of spaced side walls 48 converging, as at 49, at the front to provide contours adapted to offer less resistance to the flow of the incoming air through the opening 40 and create less turbulence as the air enters the passages 50 at opposite sides of the inner shell. The walls 48 are flanged, top and bottom, as at 51 and 52, respectively, and secured to the top and bottom walls of the outer shell. The side walls of the inner shell also incline, at the rear opening 45, to provide diagonal walls 46 and 47 converging to vertically disposed reinforcing member 53. These diagonal walls are provided with openings 54 and 55 disposed in radially spaced relation from the separate openings in the rear wall of the outer shell formed by the reinforcing member 53 dividing the opening 45 and with such separate openings disposed at opposite sides of the reinforcing member.

Identical damper members 58 are pivotally mounted, as at 59, to the inside corners of the vertically disposed member 53 and are movable radially thereabout in a manner to control either the separate openings in the rear wall of the outer shell or the openings 54 and 55 in the diagonal walls of the inner shell and are operated by means of an air motor 60 having a plunger 61 operatively connected to the respective dampers by means of connecting links 62 pivotally secured to each. The air motor is secured to a supporting member 63 attached to the upper flanges 51 of the inner shell 32 and extending across an opening 64 in the top wall of the outer shell to provide access to the air motor for mounting and servicing. The opening 64 is closed by a cover 65 removable when it is desired to get at the motor 60. The motor 60 may be controlled manually to adjust the dampers to the position desired, at will, or, if desired, may be thermostatically controlled automatically to regulate the positions of the dampers in accordance with conditions in the vehicle interior.

The bottom of the inner shell is formed by the bottom wall 37 which, in the area of the inner shell, is provided with an opening 66 surrounded by the upstanding flanged collar 67 and communicating with the interior of the vehicle through the roof 14 and by means of a longitudinal duct 68 extending substantially the full length of the roof of the vehicle. The opening 66 is disposed substantially at the center of the roof of the vehicle, while the duct 68 is disposed at one side of the center; and a short, transverse duct 69 connects the opening 66 directly with the duct 68. The duct 68 is provided with air outlets 70 opening to the interior of the vehicle and emitting air in a direction towards the center thereof, and is also provided with air outlet openings 71 at the top of the windows 13. At the position where the transverse duct 69 opens into the longitudinal duct 68, the latter duct is provided with a baffle plate 72 extending beyond opposite sides of the transverse duct a distance sufficient to insure equal distribution of the air in the longitudinal duct and prevent short-circuiting of the air directly to the lower outlets 71 and thereby create the desired pressure at both the outlets 70 and 71. At opposite sides of the area where the transverse duct enters the longitudinal duct, the baffle plate 72 is of reduced height, as at 73 in Fig. 1, to insure more equable distribution of the air between the longitudinally extending portion of the duct and that portion leading to the window outlet openings 71.

In the operation of the ventilator, air, induced by the forward motion of the car, enters the divided front opening 40, traverses the passages 50 at opposite sides of the inner shell, and, with the dampers 58 in position to close the separate openings in the rear wall 42, as shown in Fig. 3, enters the inner shell through the rear diagonal openings 54 and 55 to move forwardly in the inner shell and downwardly through the opening 66 in the roof of the vehicle to enter the duct 68 for distribution to the vehicle interior.

When the dampers 58 are disposed in a position to close the diagonal openings 54 and 55 at the rear of the inner shell, as shown in Fig. 2, the air entering at the divided front opening 40 sweeps through the passages 50 to exhaust through the divided rear opening 45 and thereby clear the ventilator, itself, of any accumulations of dirt and snow, or the like, and then is directed, by means of the air chute formed by the shrouds 27, over the trolley base mounting effectively to clear that assembly of any accumulation of dirt and snow, or the like. It will thus be seen that the insulating properties of the resilient bushings 19 will be maintained in their most efficient condition and prevented from becoming ineffective due to accumulations of ice and snow, since it readily will be seen that any accumulation of ice between the trolley base platform and the pan brackets 21, or roof, will destroy the resilient properties of the bushings 19 and thus transmit all vibrations and sound created by the trolley pole 15, during operation, through the roof to the interior of the vehicle. Any moisture accumulating in the ventilator is drained off through outlet openings 75 disposed at the lower edge of each side wall of the outer shell. Outlet openings 56 are provided in opposite side walls of the inner shell also to permit draining of moisture.

What is claimed is:

1. A vehicle, a ventilator for the vehicle comprising a shell mounted on the vehicle and having an air intake opening and an outlet opening, a member disposed within the shell and having an opening in spaced relation to said outlet opening, an opening in the ventilator communicating with the interior of the vehicle, damper means between said openings-in-spaced-relation adapted to close one or the other of such openings and direct air from said intake opening through said outlet opening or to said opening communicating with the interior of the vehicle, and means at said outlet opening to control and direct the air issuing therefrom including spaced substantially parallel members disposed one at each side of the opening and substantially normal to the plane of the opening.

2. A trolley vehicle having a trolley and including a trolley-base mounting, a shroud enclosing said mounting, a ventilator for the vehicle disposed for association with said shroud and comprising an outer shell having an air intake opening and an air outlet opening and an inner shell extending between and dividing said openings and so disposed within the outer shell as to provide separate air passages on opposite sides thereof and having air inlet openings in spaced relation to said outlet openings, an air distribution opening, damper means individual to the respective air passages pivoted adjacent the center of said outlet opening and movable to control said inlet and outlet openings whereby to direct air from the respective passages to said distribution opening or through said shroud and over the trolley-base mounting, means controlling said damper means for joint operation, and a duct communicating with said distribution opening for distributing air to the interior of said vehicle.

3. A trolley vehicle having a trolley and including a trolley-base mounting, a shroud enclosing said mounting, a ventilator for the vehicle disposed for association with said shroud and comprising an outer shell having openings front and rear and an inner shell having a rear opening and a bottom opening, said front opening comprising an air intake, said first-named rear opening comprising an air outlet communicating with said shroud, said second-named rear opening comprising an air inlet to the inner shell, said bottom opening comprising a distribution opening to the interior of said vehicle, and damper means controlling said rear openings whereby one or the other of such openings may be closed and air from the outer shell directed through said shroud over the trolley-base mounting or through the inner shell to said bottom distribution opening.

4. A trolley vehicle having a trolley and including a trolley-base mounting, a shroud enclosing said mounting, a ventilator for the vehicle disposed for association with said shroud and comprising an outer shell having an air intake opening and an air outlet opening and an inner shell extending between and dividing said openings and so disposed within the outer shell as to provide separate air passages on opposite sides thereof and having air inlet openings in spaced relation to said outlet opening, an air distribution opening communicating with the interior of the vehicle, damper means individual to the respective air passages pivoted adjacent the center of said outlet opening and movable to control said inlet and outlet openings whereby to direct air from the respective passages to said distribution opening and the interior of the vehicle or through said shroud and over the trolley-base mounting, and means controlling said damper means for joint operation.

5. A trolley vehicle having a trolley and including a trolley-base mounting, a shroud enclosing said mounting, a ventilator for the vehicle disposed for association with said shroud and comprising an outer shell having an air intake opening and an air outlet opening and an inner shell extending between and dividing said openings and so disposed within the outer shell as to provide separate air passages on opposite sides thereof and having air inlet openings in spaced relation to said outlet opening, an air distribution opening communicating with the interior of the vehicle and damper means pivotally mounted between and movable to control said inlet and outlet openings whereby to direct air from the respective passages to said distribution opening and the interior of the vehicle or through said shroud and over the trolley-base mounting.

6. A vehicle, a ventilator for the vehicle comprising an outer shell mounted on the roof of the vehicle and having a front opening comprising an air intake and a rear opening comprising an air outlet, an inner shell extending from said intake to said outlet and disposed within the outer shell in a manner to divide said openings and provide separate air passages upon opposite sides of the inner shell, separate air inlet openings at the rear of said inner shell individual to the respective air passages and disposed in spaced relation to said divided rear outlet opening, damper members pivotally mounted adjacent the center of the divided outlet opening each controlling an inlet opening and the outlet opening in respective air passages whereby to direct the air therefrom either through said divided rear outlet or through said inlet openings to the inner shell, and a distribution opening from said inner shell to the interior of said vehicle.

7. A vehicle, a ventilator for the vehicle comprising an outer shell mounted on the roof of the vehicle and having a front opening comprising an air intake and a rear opening comprising an air outlet, an inner shell extending from said intake to said outlet and disposed within the outer shell in a manner to divide said openings and provide separate air passages upon opposite sides of the inner shell, separate air inlet openings at the rear of said inner shell individual to the respective air passages and disposed in spaced relation to said divided rear outlet opening, damper members pivotally mounted adjacent the center of the divided outlet opening each controlling an inlet opening and the outlet opening in respective air passages whereby to direct the air therefrom either through said divided rear outlet or through said inlet openings to the inner shell, means for controlling the positions of said dampers, and a distribution opening from said inner shell to the interior of said vehicle.

8. A vehicle, a ventilator for the vehicle comprising an outer shell mounted on the vehicle and having an air intake opening and an air outlet opening, an inner shell disposed within the outer shell and having an opening in spaced relation to said outlet opening and an opening communicating with the interior of said vehicle, and damper means between said openings-in-spaced-relation adapted to close one or the other of such openings and direct air from said intake opening through said outlet opening or through said opening communicating with the interior of the vehicle.

CHARLES H. TURNER.